Jan. 2, 1968   D. E. GARRETT   3,361,520
PROCESS FOR THE PREPARATION OF ANHYDROUS ALUMINUM CHLORIDE
Filed Feb. 19, 1965   2 Sheets-Sheet 1
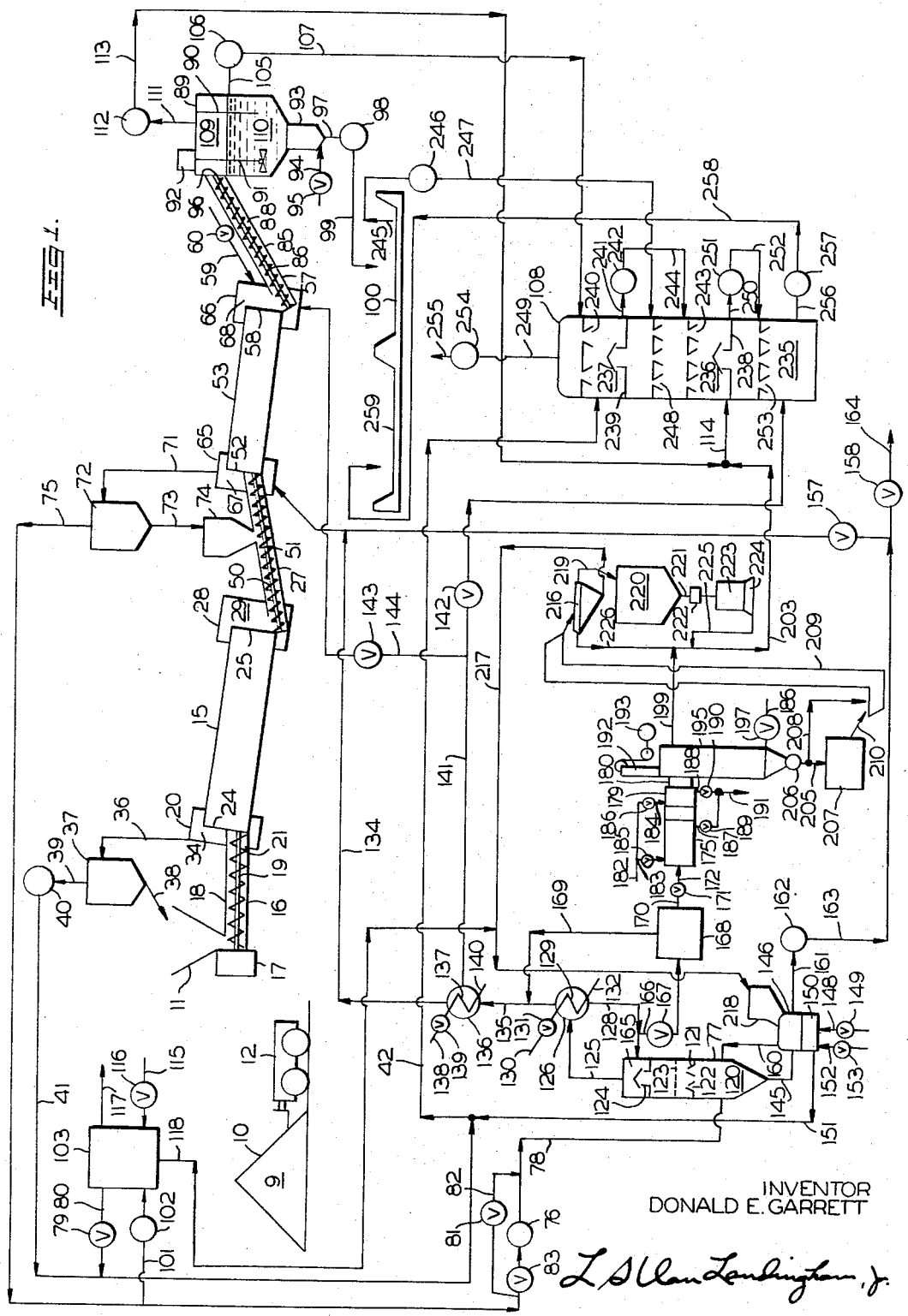
INVENTOR
DONALD E. GARRETT
ATTORNEY Jan. 2, 1968   D. E. GARRETT   3,361,520
PROCESS FOR THE PREPARATION OF ANHYDROUS ALUMINUM CHLORIDE
Filed Feb. 19, 1965   2 Sheets-Sheet 2
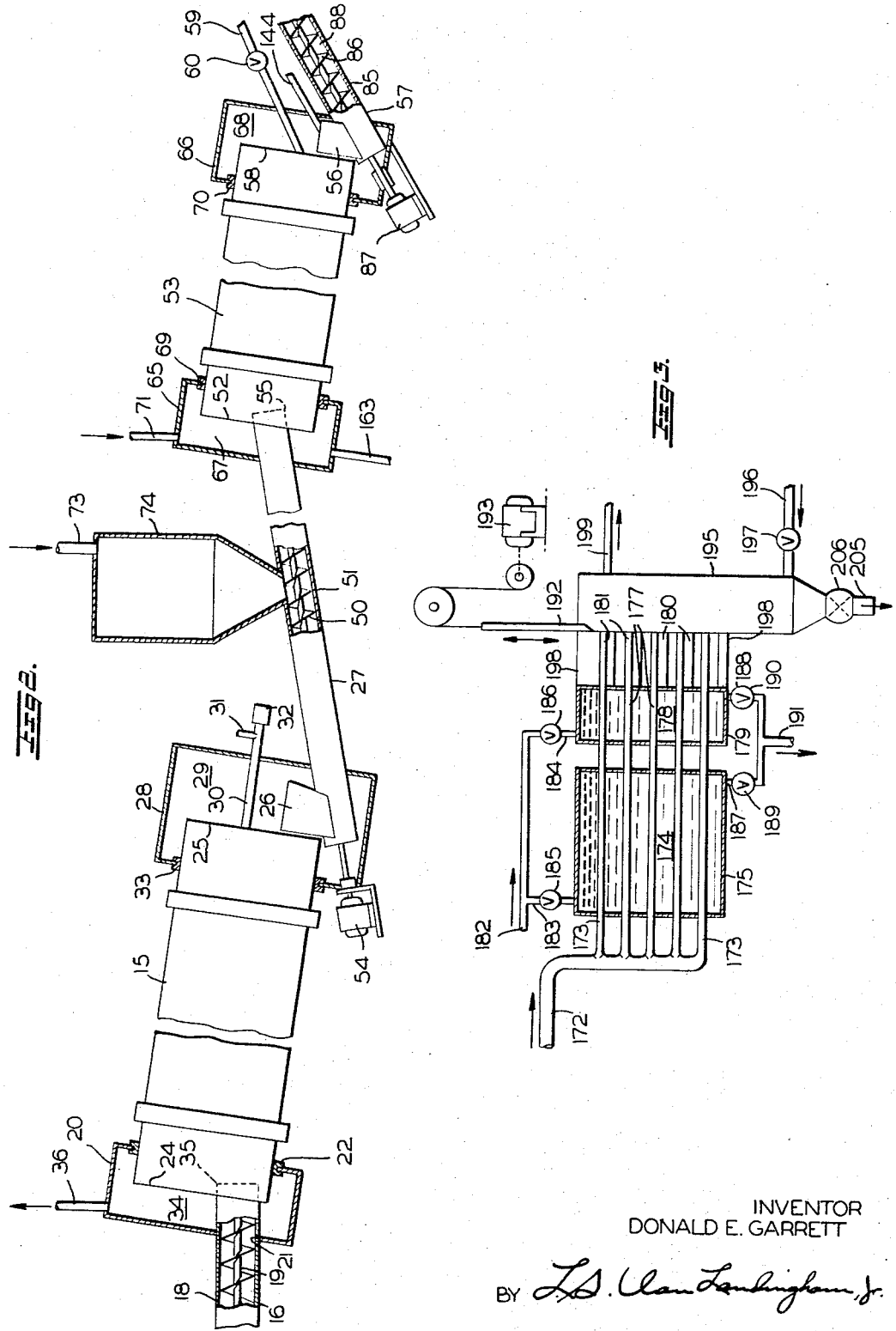
INVENTOR
DONALD E. GARRETT
BY *L. S. Van Landingham Jr.*
ATTORNEY

3,361,520
PROCESS FOR THE PREPARATION OF ANHYDROUS ALUMINUM CHLORIDE

Donald E. Garrett, Pomona, Calif., assignor to Garrett Research & Development Co., La Verne, Calif.
Filed Feb. 19, 1965, Ser. No. 433,981
3 Claims. (Cl. 23—93)

ABSTRACT OF THE DISCLOSURE

Metallic aluminum, which may be low grade aluminum scrap including aluminum slag or the residue from an aluminum slag reclaiming operation, is converted into substantially pure anhydrous aluminum chloride. In one preferred variant of the invention, the slag or other source of aluminum is dried, if required, and passed through a rotating indirect fired or cooled chlorination furnace. The resulting impure anhydrous aluminum chloride gas from the furnace is compressed and distilled to produce a pure liquid anhydrous aluminum chloride product, which is then molded or cooled and extruded into the desired sized and shaped product. It is thereby possible to convert an inexpensive source of aluminum into a high quality product in simple and inexpensive equipment at a cost far below presently existing processes.

---

This invention broadly relates to the preparation of anhydrous aluminum chloride. In one of its more specific aspects, the invention further relates to a novel process for preparing and processing anhydrous aluminum chloride from low-grade aluminum-bearing materials under conditions whereby contamination is substantially reduced. The invention also relates to an improved process for preparing pelletized anhydrous aluminum chloride directly from molten aluminum chloride.

There are two general processes presently used on a commercial scale for the production of anhydrous aluminum chloride. The first process involves the direct chlorination of molten metallic aluminum, and the second process involves the chlorination of an aluminum mineral such as bauxite mixed with coke or other suitable reducing agent. In the first process in which molten aluminum is directly chlorinated, the plant capital costs are relatively low; however, high purity and thus expensive metallic aluminum must be employed in order to obtain a high quality anhydrous aluminum chloride product. In the second process, the raw materials employed are much less costly, but an elaborate and expensive plant is required. Thus, the prior art processes heretofore available for the production of high quality anhydrous aluminum chloride have not been entirely satisfactory as they are not capable of employing low cost raw materials in combination with a simple and inexpensive plant.

Another important disadvantage of prior art processes for the preparation of anhydrous aluminum chloride by chlorination of a raw material has been the escape into the surrounding atmosphere of corrosive and/or poisonous substances such as elemental chlorine and aluminum chloride vapor. The disposal of the solid non-volatile residue remaining after the chlorination has taken place also has been a problem. These disadvantages of the prior art processes also are overcome by the present invention.

The prior art anhydrous aluminum chloride products often are prepared by crushing solidified anhydrous aluminum chloride, followed by screening to obtain a fraction having a desired particle size. This process necessarily results in a loss of production due to the fines which must be reprocessed. Additionally, the resulting aluminum chloride particles do not have a substantially uniform size, shape and surface area due, among other reasons, to the surface irregularities of the particles. These and many other disadvantages likewise may be overcome by the present invention.

It is an object of the present invention to provide a novel process for the preparation of anhydrous aluminum chloride.

It is a further object to provide a novel process for purifying and processing a crude anhydrous aluminum chloride product prepared by chlorination of a low-grade aluminum-bearing material.

It is still a further object to provide a novel process for preparing pellets of anhydrous aluminum chloride from liquid anhydrous aluminum chloride.

It is still a further object to provide a novel chlorination process for the preparation of anhydrous aluminum chloride from an aluminum-bearing substance whereby obnoxious fumes and the chlorination residue is disposed of without contaminating the atmosphere and the working area.

Still other objects and advantages will be apparent to those skilled in the art upon reference to the following detailed description and the drawings, wherein:

FIGURE 1 diagrammatically illustrates one presently preferred arrangement of apparatus for preparing anhydrous aluminum chloride in accordance with the present invention;

FIGURE 2 is an enlarged side view partially in cross section of the rotary drier, rotary chlorinator, and feed and discharge apparatus associated therewith which are illustrated in FIGURE 1; and FIGURE 3 is an enlarged side view partially in cross section of the liquid anhydrous aluminum chloride solidifier, pelletizer and air cooler of FIGURE 1.

Referring now to the drawings, a suitable aluminum-bearing substance 9 for preparing aluminum chloride by chlorination may be transferred from storage pile 10 to feed hopper 11 by means of loader 12. Examples of suitable aluminum-bearing materials include pure metallic aluminum, aluminum scrap, aluminum turnings, aluminum slag, skimmings or fused masses of low grade aluminum chloride, and the like. Low-grade or impure aluminum-bearing substances are satisfactory and are usually preferred for economic reasons as they are much cheaper. In instances where a low-grade metallic aluminum such as impure scrap, turnings or slag is used, it may be pre-cleaned by prior art processes such as by degreasing but usually this is not necessary. Some carbon or other reducing agent, and salt and/or borax to lower the reduction temperature, may be added to slag or other materials containing aluminum oxide to reduce the oxide and minimize AlOCl formation.

The aluminum-bearing substance 9 is fed to rotary dryer 15 by means of a screw feeder 16 which includes a motor 17 for driving screw 19. The screw 19 is arranged within airtight tubular member 18 whereby a substantially airtight seal is formed along its length. Also, the screw 19 is preferably operated so as to be completely filled with the aluminum-bearing substance 9 to thereby reduce the amount of air and other contaminants which would otherwise pass into the interior of rotary dryer 15.

As is best seen in FIGURE 2, the rotary dryer 15 is provided on its feed end with a seal 20 having an opening 21 therein through which the tubular member 18 extends in such a manner so as to be in sealing relationship. Also, the sealing member 20 is in sealing relationship with the peripheral surface of the feed end 24 of the rotary dryer 15 due to annular member 22 which cooperates therewith during rotation to provide an airtight seal between member 20 and the outer surface of dryer 15.

The rotary dryer 15 is inclined downward from the feed end to the discharge end to thereby allow the contents to be discharged conveniently from the discharge end 25 into a hopper-like member 26 which serves to pass the dried aluminum-bearing substance 9 into an upwardly inclined screw feeder 27. The discharge end 25 is provided with a seal member 28 which is similar in construction to seal member 20. A portion of the seal member 28 is spaced from the discharge end 25 so as to provide a space 29 through which extends burner 30. The burner 30 is in sealing relationship with member 28 and is supplied with a carbonaceous fuel such as natural gas by means of conduit 31 and air by means of conduit 32 to thereby provide a combustible mixture for burner 30 which is ignited and burned within the interior of dryer 15. The member 28 is provided with an annular member 33 extending around the periphery of rotary dryer 15 and which is in sealing relationship with the peripheral surface and member 28 during rotation. The dryer 15 is also provided with driving means which is not shown in the interest of clarity for the purpose of rotating dryer 15 at a desired rate.

The sealing member 20 is spaced from the feed end 24 so as to provide a space 34 through which the screw feeder 16 extends with its internal end 35 being located within the interior of dryer 15. The conduit 36 is in communication with the space 34 and also with the interior of dryer 15 as the ends of dryer 15 are open. The combustion gases pass through the dryer 15 from burner 30 to conduit 36 in countercurrent relation to the aluminum-bearing substance 9 to be dried, which passes from the end 35 of feeder 16 through dryer 15 to hopper 26. The combustion gases and entrained finely divided solids are passed via conduit 36 to cyclone 37 where solid material is removed and returned to feed hopper 11 via conduit 38. The combustion gases and some remaining dust are withdrawn from cyclone 37 and passed via conduit 39 to blower 40, and then passed via conduit 41 to conduit 42. The combustion gases are then treated to remove remaining dust and obnoxious fumes, as will be described more fully hereinafter.

The dryer 15 is maintained by means of burner 30 at a sufficiently high temperature to remove moisture in the aluminum-bearing substance 9, and combustible substances such as oil and grease also may be removed. The aluminum-bearing substance 9 discharged into hopper 16 may be substantially free of moisture as well as combustible impurities, and may be heated to an elevated temperature which is sufficient to initiate a reaction between the aluminum content and elemental chlorine. The temperature of the material 9 discharged into hopper 26 should be above 100° C., and is preferably at least 200° C., although the temperature may be varied somewhat if desired to control the temperature during chlorination.

The dried aluminum-bearing substance 9 is transferred to screw feeder 27 by means of hopper 26, and is then fed by screw 50 arranged within tubular member 51 to the feed end 52 of downwardly inclined rotary chlorinator 53. The screw 50 is driven by motor 54, and is preferably operated completely filled with the dried aluminum-bearing substance 9 so as to reduce the amount of air, chlorine, aluminum chloride vapor or other gaseous material entering or leaving chlorinator 53 via this route. Therefore, the screw feeder 27 not only transfers the aluminum-bearing substance 9 to chlorinator 53 but also aids in sealing chlorinator 53 off from the surrounding atmosphere.

The discharge end 55 of screw feeder 27 is arranged within the upper or feed end 52 of chlorinator 53 and the dried aluminum-bearing substance is discharged therein. Upon rotation of chlorinator 53, the material 9 passes downward therethrough and is reacted with chlorine to produce anhydrous aluminum chloride which immediately vaporizes or sublimes under the reaction conditions. The non-volatile residue is eventually discharged into hopper 56 which feeds screw conveyor 57. During passage of the aluminum-bearing substance 9 through rotary chlorinator 53, it is contacted in countercurrent relationship with gaseous elemental chlorine supplied to the exit end 58 via conduit 59 at a rate controlled by valve 60.

The feed end 52 and the exit end 58 are provided with seal members 65 and 66, respectively, which may be similar in construction to sealing members 20 and 28, respectively. The sealing members 65 and 66 are spaced from their respective ends 52 and 58 so as to provide spaces 67 and 68. The sealing member 65 is in sealing engagement with screw feeder 27, and also with the annular member 69 which extends around the peripheral surface of chlorinator 53 to thereby provide an airtight seal between the peripheral surface and sealing member 65 during rotation of chlorinator 53. Similarly, sealing member 66 is in sealing engagement with annular member 70 which extends around the peripheral surface of exit end 58 to thereby provide an airtight seal between the peripheral surface and sealing member 66 during rotation of chlorinator 53. The sealing member 66 is also in sealing relationship with the conduit 59, as well as the screw conveyor 57 and the associated driving means therefor.

The rotary chlorinator 53 is driven by prior art driving means which is not shown in the interest of simplifying the drawings at a rate to assure intimate contact between the aluminum-bearing substance 9 and the chlorine gas supplied via conduit 59. The temperature existing within chlorinator 53 may be maintained at a desired level by controlling the rate of feed of chlorine or by other methods to be described hereinafter. The chlorinating temperature should be at least 178° C. and sufficiently elevated to cause the aluminum chloride to sublime or evaporate, and may be above the melting point of aluminum but below the boiling point thereof. Usually, chlorination temperatures between about 200° C. and 400° C. are preferred as certain impurities are volatile at higher temperatures and there is a tendency toward formation of undesirable impurities such as aluminum oxychloride and other undesirable byproducts. Ferric chloride boils at 315° C. under atmospheric pressure and often a chlorination temperature below its boiling point is preferred in order to reduce contamination of the product, such as about 178–310° C. and preferably about 200–300° C.

The resulting anhydrous aluminum chloride vapor is withdrawn from the space 67 via conduit 71 together with impurities such as dust and elemental chlorine and is passed to cyclone 72. Entrained solid material including dust is removed in cyclone 72 and is passed via conduit 73 to hopper 74 which is in communication with the interior of tubular member 51. The solid material removed by cyclone 72 is recycled back to chlorinator 53 by means of screw feeder 27. The gas withdrawn from cyclone 72 via conduit 75 contains gaseous anhydrous aluminum chloride together with other gaseous impurities and some entrained finely divided solids and is further processed to obtain a purified product as will be described more fully hereinater.

The non-volatile residue is withdrawn from the exit end 58 of chlorinator 53 and is passed to hopper 56 and fed to screw conveyor 57. The screw conveyor 57 is provided with a tubular member 85 in which screw 86 driven by motor 87 is arranged. The non-volatile residue preferably fills the space 88 of screw 86 so as to reduce the volume of fumes passing from the chlorinator 53 via the conveyor 57. The non-volatile residue is passed by screw conveyor 57 to washer 89.

The washer 89 is provided with a baffle 90 and a rotary agitator 91 driven by motor 92, and it tapers on its bottom end into a leg 93. Water is supplied to the bottom of leg 93 via conduit 94 at a rate controlled by valve 95, and it flows upward into washer 89 in countercurrent relationship with the relatively heavy non-volatile matter discharged by screw 57. As the non-volatile matter falls downward from its point of entry at 96, it is vigorously washed free of soluble salts by water agitated by agitator 91 and it then falls downward into leg 93 where it is withdrawn via conduit 97 and transferred by pump 98 via conduit 99 to residue pond 100. The baffle 90 is disposed between the point of entry 96 of the non-volatile matter and the point of withdrawal via conduit 105 of relatively clear wash water containing dissolved salts which were present initially in the non-volatile matter. The water withdrawn via conduit 105 is transferred by means of pump 106 via conduit 107 to fume scrubber 108. Fumes which collect in the space 109 above the water 110 are withdrawn via conduit 111 and transferred by means of blower 112 via conduits 113 and 114 to scrubber 108.

When the chlorinator 53 is operated at a relatively low pressure under which liquid anhydrous aluminum chloride is not stable, it is preferred to close valve 79 in conduit 80 and valve 81 in conduit 82, then open valve 83 and pass the gaseous aluminum chloride via conduit 75 to compressor 76 where it is compressed to a pressure sufficiently high so that liquid phase anhydrous aluminum chloride is stable. The pressure, for example, may be 34 p.s.i.g. or higher, and preferably is sufficiently high so that no difficulty is experienced in producing and maintaining a liquid phase. The compressed aluminum chloride vapor is then passed to distillation column 77 via conduit 78.

The compressed aluminum chloride vapor flowing in conduit 78 contains impurities which may include gaseous substances, dust and other solid matter. A substantial amount of dust must be handled in the lower section 120 of distillation column 77, and to aid in this a plate 121 is provided with inverted cone-like venturi openings 122 therein. The impure rising vapors of aluminum chloride pass through openings 122 at a relatively high velocity and impinge on the bars 123 arranged thereabove at a high velocity. Some liquid is aspirated into the vapor stream, thereby giving a relatively high dust collection efficiency. The rising vapors then pass through bubble tray 124 where further purification of the aluminum chloride vapors is accomplished. If desired, several bubble trays may be provided so as to assure a higher purity of product. The aluminum chloride vapor withdrawn from the top of distillation column 77 via conduit 125 is passed to condenser 126 where it is condensed to liquid aluminum chloride, and the resulting liquid aluminum chloride is withdrawn via conduit 128. The condenser 126 may be provided with a cooling coil 129, to which water or other suitable coolant is supplied via conduit 130 at a rate controlled by valve 131 and withdrawn via conduit 132. The remaining uncondensed vapor, if any, is withdrawn from condenser 126 via conduit 135 and passed to a second condenser 136. The vapor is further cooled by means of a cooling coil 137, to which water or other suitable coolant may be supplied via conduit 128 at a rate controlled by valve 139 and withdrawn via conduit 140. The aluminum chloride, if any, condensed in condenser 136 may contain impurities and is withdrawn and passed via conduits 134 and 163 to chlorinator 53. The non-condensable gases are withdrawn from condenser 136 via conduit 141 and upon opening valve 142 and closing valve 143 in conduit 144, may be passed to scrubber 108. Preferably, at least a portion of the gases are passed to the exit end 58 of chlorinator 53 to strip chlorine and aluminum chloride vapor from the non-volatile residue via conduit 144 upon opening or partially opening valve 143 and closing or partially closing valve 142.

The impure liquid aluminum chloride in the bottom section 120 of distillation column 77 may be withdrawn via conduit 145 and passed to reboiler 146. The reboiler 146 is a direct gas-fired vessel, to which combustible gas and air are fed via conduits 148 and 152 at rates controlled by valves 149 and 153, respectively, and burned within firebox 150. The flue gas is withdrawn via conduit 151 and passed to conduit 42 where it is combined with flue gases from the dryer 15 and passed to scrubber 108. The aluminum chloride content in the stream withdrawn via conduit 145 is vaporized within reboiler 146, and the vapor is withdrawn via conduit 160 and returned to the lower section 120 of distillation column 77 for further purification. The substantially non-volatile residue containing little, if any, aluminum chloride and substantial amounts of dust may be withdrawn via conduit 161, and upon opening valve 157 and closing valve 158, is transferred by pump 162 via conduit 163 to chlorinator 53 where any aluminum or aluminum chloride content may be recovered. In instances where the chlorinator 53 is operated at a temperature above the boiling point of ferric chloride, then it is usually desirable to close valve 157, open valve 158, and discard the residue via conduit 164.

When the chlorinator 53 is operated under a superatmospheric pressure of at least 34 p.s.i.g., then the aluminum chloride vapor flowing in conduit 75 need not be compressed before passing to distillation column 77. In such instances, the compressor 76 may be bypassed by closing valve 83 and opening valve 81, and passing the aluminum chloride vapor directly to column 77 via conduits 75, 82 and 78.

If desired, solid sublimed anhydrous aluminum chloride may be recovered from the stream of vapor flowing in conduit 75. This may be accomplished by withdrawing all or a portion of the vapor via conduit 101 and passing it by means of blower 102 to condenser 103 where it is contacted with a cool surface to condense solid anhydrous aluminum chloride. The condenser 103 may be cooled by means of a cooling fluid such as water supplied thereto via conduit 115 at a rate controlled by valve 116 and withdrawn therefrom via conduit 117. The sublimed anhydrous aluminum chloride product may be withdrawn via conduit 118 and passed to reboiler 146 via conduit 217 and hopper 218 where it is vaporized and the vapors passed to distillation column 77 via conduit 160. The uncondensed vapor or other gases are withdrawn from condenser 103 via conduit 80 at a rate controlled by valve 79 and passed to scrubber 108 via conduits 41 and 42.

A portion of the molten aluminum chloride flowing in conduit 128 may be passed to the upper section 165 of distillation column 77 as reflux, and a second or product portion is withdrawn via conduit 166 at a rate controlled by valve 167 and passed to storage tank 168. Any uncondensed aluminum chloride vapors present in tank 168 may be withdrawn via conduit 169 and passed via conduit 135 to condenser 136 where they are condensed and recycled.

As is best seen in FIGURES 1 and 3, liquid aluminum chloride which may be at a temperature of about 180° C. or higher and preferably about 200° C., is withdrawn from storage vessel 168 via conduit 170 and forced by means of pump 171 through header 172 which feeds a plurality of tubes 173. The tubes 173 pass through a first water bath 174 in vessel 175 which is at a carefully controlled temperature such as about 70–95° C. that is designed to result in cooling to slightly above the freezing or solidification point of the molten aluminum chloride. The tubes 173 containing partially cooled aluminum chloride now only slightly above its solidification temperature are then passed through a second water bath 178 in vessel 179 which is much cooler than the bath 174 and may have, for example, a temperature of about 20–50° C. The aluminum chloride partially solidifies while in the tubes within the bath 178 and is extruded therefrom upon Teflon holding plates 180 as partially solidified or semi-solid rod-like or elongated portions 181. In some instances, the outer surface of the portions 181 may be entirely solidified and the interior is still only partially solidified due to the time required for heat transfer. Cooling water having a temperature of, for example, 10–40° C. is fed to vessels 175 and 179 via header 182 and conduits 183 and 184 at rates controlled by valves 185 and 186, respectively, to maintain the desired bath temperatures. The hot water in water baths 175 and 179 is withdrawn via conduits 187 and 188 at rates controlled by valves 189 and 190, respectively, and passed to header 191 where it is withdrawn and discarded. The partially solidified rod-like portions 181 as they are extruded are cut into desired lengths by means of chopper 192 which is powered by motor 193. The resulting pellets fall downward through cool, dry gas in cooling tower 195, at the bottom of which is fed a stream of dry cooling gas such as dry air which may have a temperature of, for example, 10–40° C., via conduit 196 at a rate controlled by valve 197. A hood 198 which is substantially airtight surrounds the extruded aluminum chloride 181 and the top of cooling tower 195 as otherwise atmospheric moisture would adversely effect the anhydrous aluminum chloride product.

Aluminum chloride vapor or fumes from other sources may be withdrawn from the top of cooling tower 195 via conduit 199 and passed via conduits 203 and 114 to scrubber 108.

The solidified anhydrous aluminum chloride pellets may be withdrawn from the bottom of cooling tower 195 via conduit 205 upon opening rotary gate 206 and passed to hammer mill 207 in instances where the pellet size is not sufficiently small. Normally, the pellets are of a desired size as produced and the hammer mill 207 is bypassed via conduit 208 and the pellets passed directly to enclosed elevator 209. When the pellets are passed through hammer mill 207, the resulting aluminum chloride particles are withdrawn via conduit 210 and passed to the bottom of elevator 209.

The aluminum chloride particles are passed upward by enclosed elevator 209 and discharged onto a vibrating screen 216 which is enclosed to protect the aluminum chloride from the atmosphere. The screen 216 separates aluminum chloride fines which are then withdrawn via conduit 217 and returned to hopper 218 where they are fed to reboiler 146 for recycle in the process. When the pellets are not passed through the hammer mill, substantially no fines are produced. The properly size product is withdrawn from the top of screen 216 and passed via conduit 219 to a prior art drum packaging device which may be of the Robertson type. The packaging device may include a silo 220 from which aluminum chloride pellets may be withdrawn via conduit 221 and passed at a rate controlled by feeder 222 to an enclosed drum 223 on scales 224. Fumes may be withdrawn from the enclosed drum packaging area via conduit 225 and from the enclosed vibrating screen 216 via conduit 226, and passed via conduits 203 and 114 to scrubber 108.

The scrubber 108 is divided into lower, intermediate and upper sections 235, 236 and 237, respectively, by bubble trays 238 and 239. Relatively clear wash water flowing in conduit 107 is passed to sprays 240, where it is injected into the upper section 237 and contacted with the flue gases flowing in conduit 42 for the purpose of removing dust and noxious substances before being withdrawn via conduit 249. The wash water collecting on tray 239 is withdrawn via conduit 241 and transferred by pump 242 to sprays 243 via conduit 244. Also, water is withdrawn from residue pond 100 via conduit 245 and transferred by pump 246 via conduit 247 to sprays 248. The collection of noxious fumes flowing in conduit 114 is passed into section 236, and then intimately contacted successively with water from sprays 243 and 248 before passing upward through bubble tray 239 into section 237 where it is contacted with sprays 240 before being withdrawn via conduit 249. The water collecting on tray 238 is withdrawn via conduit 250 and transferred by pump 251 via conduit 252 to sprays 253, where it is contacted in section 235 with the noncondensed fumes flowing in conduit 141. The gases in section 235 are then passed successively through trays 238 and 239 in sections 236 and 237 and contacted with sprays 243, 248 and 240 before being withdrawn via conduit 249. An exhaust blower 254 is provided for maintaining a suction on conduit 249, and also on all of the various conduits flowing into scrubber 108 and in communication therewith. The gases are finally exhausted to the atmosphere from blower 254 via conduit 255. The water from the various sprays is withdrawn from the bottom of section 235 via conduit 256 and is transferred by pump 257 via conduit 258 to solution pond 259.

The chlorination may be accomplished in conventional water-jacketed or otherwise cooled molten aluminum reactors, fixed or moving bed equipment of a design other than a rotary reactor, or in a plurality of small water cooled reactors. However, rotary reactors such as illustrated in the drawings are simple in construction and relatively cheap in cost, and also are well suited to the chlorination of metallic aluminum in particulate form, such as aluminum turnings, small scrap, and the like.

The reaction of elemental chlorine and aluminum is highly exothermic but the chlorinator may be maintained at a desired reaction temperature by one or a combination of methods. For example, the rotary reactor illustrated in the drawings may be cooled by means of internally or externally arranged water cooling coils or jackets. The rate of chlorine addition also may be controlled so as to aid in controlling the reaction temperature. It is possible to cool the dried aluminum-containing material from drier 15 prior to passing it to chlorinator 53 or use other expedients such as supplying cool inert solids to hopper 74 and operating screw feeder 27 at a rate sufficiently high to deliver the cooled solids together with the incoming feed of aluminum-bearing material. Additionally, cool, dry air or inert gas may be supplied to the exit end 58 of chlorinator 53, or relatively cool aluminum chloride in liquid, solid or vapor form may be supplied thereto for the purpose of absorbing heat. The aluminum chloride coolant is vaporized and recovered in the system in the usual manner and thus aluminum chloride product is not lost.

The chlorinator may be reacted at a superatmospheric pressure sufficiently high to allow liquid phase aluminum chloride to be stable, such as a pressure of 34 p.s.i.g. or higher. Usually, pressures higher than about 5.2 atmospheres are not desirable, although much higher pressures may be employed. The use of high pressures results in increased leakage of chlorine, aluminum chloride vapor, and other fumes to the atmosphere and elevated pressure operation usually is not preferred although it does have the advantage of eliminating compression of the aluminum chloride vapor prior to purification by distillation.

It is usually preferred to operate the chlorinator at about atmospheric pressure or slightly less to prevent undue leakage of gaseous chlorine and aluminum chloride vapor to the surrounding atmosphere or entry of atmospheric moisture into the system. Usually, a slight negative pressure is satisfactory such as about 10–14 p.s.i.a., for example, and it is not desirable to employ subatmospheric pressures which are markedly lower. In most instances, a desirable subatmospheric pressure may be easily maintained by means of an exhaust blower such as that illustrated in the drawings.

The anhydrous aluminum chloride product of the invention is preferably pelletized by the extrusion method illustrated herein to produce shapes having a desired cross section, such as solid or perforated rods, tubes, etc. having a diameter of, for example, about $\frac{1}{32}$–$\frac{1}{2}$ inch which may be cut into substantially identical lengths. This assures that a given weight of the anhydrous aluminum chloride product will have a predictable surface area, and also fines or large particles are not a problem and do not require reworking. While not preferred, it is also possible to solidify the liquid anhydrous aluminum chloride product by other methods, such as by means of chilled rolls followed by crushing and screening or in a spray prilling tower.

The foregoing detailed description and the following specific example are for purposes of illustration only, and are not intended as being limiting to the spirit or scope of the appended claims.

*Example*

This example illustrates one variant of the process of the invention for preparing pelletized anhydrous aluminum chloride from an impure aluminum-containing material employing apparatus similar to that illustrated in the drawings.

Impure metallic aluminum in the form of turnings contaminated with moisture and the usual oil and grease is passed to a gas-fired rotary dryer where it is heated to a temperature of approximately 200° C. until the moisture, oil and grease are removed. The turnings are then passed to a rotary chlorinator and contacted countercurrently therein with gaseous elemental chlorine which is supplied thereto in an amount to maintain a reaction temperature of approximately 275° C. The outside surface of the chlorinator is sprayed with water to aid in maintaining the desired reaction temperature during the chlorination. The pressure existing within the chlorinator is approximately 13.5 p.s.i.a.

A mixture of the resultant gaseous anhydrous aluminum chloride, gaseous impurities, dust and other entrained solid matter is withdrawn from the chlorinator and passed to a cyclone where the dust content is largely removed. Aluminum chloride vapor containing some dust and gaseous impurities is withdrawn from the cyclone, compressed to about 80 p.s.i.a., and passed to a distillation column. The compressed aluminum chloride vapor is liquified and fractionated in the distillation column to produce a liquid aluminum chloride product that is commercially pure and thus suitable for use as a product of commerce.

The purified liquid aluminum chloride product has a temperature of about 200° C. and it is extruded through a plurality of tubes immersed in first and second water baths. The first water bath is maintained at a temperature of about 82° C. by supplying cool water thereto having a temperature of about 30° C. in quantities sufficient to maintain the desired temperature. The entering aluminum chloride is cooled to a temperature of approximately 185° C. while passing through the tubes in the first water bath, which is slightly above the solidification point. The cooled aluminum chloride while still within the same tubes is passed through a second water bath maintained at a temperature of about 35° C. and is cooled therein until the temperture of the external surface of the resulting rod-like extrusion as it is extruded from the tubes is about 175° C. However, the extrusions are not completely solidified in their interior, although they are capable of substantially maintaining their shape.

The extrusions are cut into uniform lengths as they are extruded using an automatic chopper to produce uniform pellets having the internal diameter of the tubes (¼ inch) and a length likewise of ¼ inch. The resultant pellets are completely solidified by allowing them to fall freely through an elongated column of cold air having a temperature of about 10° C. and then packaged in airtight containers for shipment.

The resultant aluminum chloride pellets are entirely satisfactory for use as catalysts or for other purposes. Due to the uniform pellet size and the lack of fines or large particles, a given weight of the product has substantially the same surface area. This is often of importance when the product is used as a catalyst or as a reactant in chemical reactions which need to be carefully controlled.

What is claimed is:
1. A process for preparing anhydrous aluminum chloride comprising the steps of
  (A) reacting gaseous elemental chlorine with dry solid impure aluminum-containing material comprising at least one substance selected from the group consisting of low grade aluminum scrap, aluminum slag and aluminum chloride skimmings to produce impure anhydrous aluminum chloride, the reaction temperature being sufficiently high to volatilize the anhydrous aluminum chloride, the dry impure aluminum-containing material and chlorine being reacted in a reaction zone with agitation whereby entrained dust impurities and volatile chlorine-containing impurities are formed and the gaseous anhydrous aluminum chloride thus produced contains the dust and chlorine-containing impurities,
  (B) withdrawing the resultant impure gaseous anhydrous aluminum chloride from the reaction zone and purifying it under superatmospheric pressure to produce purified liquid anhydrous aluminum chloride, the withdrawn impure gaseous aluminum chloride being purified by condensing therefrom a plurality of liquid fractions at a temperature above the melting point of aluminum chloride and under a superatmopheric pressure allowing condensation of liquid aluminum chloride, the first liquid fraction of condensed aluminum chloride containing impurities including the entrained dust, and thereafter condensing and separately collecting under the superatmospheric pressure a purified liquid fraction of anhydrous aluminum chloride which is substantially free of dust and volatile chlorine-containing impurities, and
  (C) solidifying the purified liquid anhydrous aluminum chloride fraction by cooling to a temperature below the sublimation point of anhydrous aluminum chloride, the purified liquid anhydrous aluminum chloride fraction being at least partially solidified by cooling before the superatmospheric pressure is released.

2. The process of claim 1 wherein the elemental chlorine and impure aluminum-containing material are reacted under a pressure not substantially greater than atmospheric pressure, the impure gaseous anhydrous aluminum chloride is compressed to a superatmospheric pressure allowing condensation of liquid aluminum chloride therefrom, and the compressed gaseous aluminum chloride is condensed and fractionated to produce a purified liquid anhydrous aluminum chloride fraction.

3. The process of claim 1 wherein the elemental chlorine and impure aluminum-containing material are reacted under a superatmospheric pressure, the withdrawn impure gaseous aluminum chloride has a superatmospheric pressure allowing condensation of liquid aluminum chloride therefrom, and the withdrawn gaseous aluminum chloride is condensed by cooling under the superatmospheric pressure and fractionated to produce a purified liquid anhydrous aluminum chloride fraction.

References Cited
UNITED STATES PATENTS

| | | | |
|---|---|---|---|
| 1,645,142 | 10/1927 | Humphrey et al. | 23—93 |
| 2,104,741 | 1/1938 | Fink. | |
| 2,387,228 | 10/1945 | Arnold | 23—93 |
| 2,548,780 | 4/1951 | Gary et al. | 264—143 |
| 3,052,518 | 9/1962 | Frey | 23—93 |
| 3,060,511 | 10/1962 | Parmella | 264—142 |
| 3,078,145 | 2/1963 | Gayol | 23—93 |

OSCAR R. VERTIZ, *Primary Examiner.*

EDWARD STERN, MILTON WEISSMAN, *Examiners.*